US009523582B2

(12) United States Patent
Chandrasekar et al.

(10) Patent No.: US 9,523,582 B2
(45) Date of Patent: Dec. 20, 2016

(54) SYSTEMS, METHODS, AND MOBILE CLIENT DEVICES FOR SUPERVISING INDUSTRIAL VEHICLES

(71) Applicant: Crown Equipment Limited, Tamaki, Auckland (NZ)

(72) Inventors: Kashyap Chandrasekar, West Harbour (NZ); Lucas B. Waltz, Coldwater, OH (US); Lisa Wong, Totara Heights (NZ)

(73) Assignee: Crown Equipment Corporation, New Bremen, OH (US)

( * ) Notice: Subject to any disclaimer, the term of this patent is extended or adjusted under 35 U.S.C. 154(b) by 2 days.

(21) Appl. No.: 14/488,660

(22) Filed: Sep. 17, 2014

(65) Prior Publication Data

US 2015/0226561 A1    Aug. 13, 2015

Related U.S. Application Data

(60) Provisional application No. 61/937,112, filed on Feb. 7, 2014.

(51) Int. Cl.
*G01M 17/00* (2006.01)
*G01C 21/20* (2006.01)
(Continued)

(52) U.S. Cl.
CPC ............ *G01C 21/206* (2013.01); *G01C 21/20* (2013.01); *G06Q 10/063* (2013.01); *G06Q 10/08* (2013.01);
(Continued)

(58) Field of Classification Search
USPC .......................... 701/2, 1, 118, 29.2, 29.3, 50
See application file for complete search history.

(56) References Cited

U.S. PATENT DOCUMENTS 8,583,314 B2 * 11/2013 de Oliveira ............ G06Q 10/06
701/29.2
2003/0063133 A1 * 4/2003 Foote .................. G06F 3/04815
715/850
(Continued)

FOREIGN PATENT DOCUMENTS

EP    1796099 A1    6/2007
EP    2211276 B1    7/2010
(Continued)

OTHER PUBLICATIONS

International Search Report and Written Opinion dated Mar. 24, 2015 pertaining to International Application No. PCT/US2014/056190 entitled "Systems, Methods, and Mobile Client Devices for Supervising Industrial Vehicles".
(Continued)

*Primary Examiner* — Thomas Tarcza
*Assistant Examiner* — Richard Goldman
(74) *Attorney, Agent, or Firm* — Dinsmore & Shohl LLP

(57) ABSTRACT

The embodiments described herein relate to systems and methods for presenting information from a management server on a mobile client device to facilitate the management of industrial vehicles. Embodiments of the system can include a plurality of industrial vehicles communicatively coupled to the management server, and a mobile client device communicatively coupled to the management server. The mobile client device can include a display, a wireless communication circuit, and one or more client processors. Encoded objects, vehicular objects, or combinations thereof can be presented upon the display of the mobile client device to present information from the management server.

23 Claims, 9 Drawing Sheets

(51) Int. Cl.
  *G06Q 10/08* (2012.01)
  *H04W 4/04* (2009.01)
  *G06Q 10/06* (2012.01)
  *G06Q 10/10* (2012.01)
(52) U.S. Cl.
  CPC .......... *G06Q 10/087* (2013.01); *G06Q 10/105* (2013.01); *H04W 4/043* (2013.01); *H04W 4/046* (2013.01)

(56) References Cited

U.S. PATENT DOCUMENTS

| | | | | |
|---|---|---|---|---|
| 2004/0143385 | A1* | 7/2004 | Smyth | G08G 1/0104 701/117 |
| 2005/0041015 | A1* | 2/2005 | Kohda | G06F 17/30265 345/156 |
| 2006/0114514 | A1* | 6/2006 | Rothschild | G06F 17/30265 358/3.28 |
| 2007/0233740 | A1* | 10/2007 | Nichols | G06F 17/30038 |
| 2008/0146274 | A1* | 6/2008 | Cho | G06F 17/30265 455/556.1 |
| 2008/0154712 | A1 | 6/2008 | Wellman | |
| 2011/0051665 | A1* | 3/2011 | Huang | G01S 5/0027 370/328 |
| 2011/0216185 | A1 | 9/2011 | Laws et al. | |
| 2011/0315765 | A1 | 12/2011 | Schantz et al. | |
| 2012/0126000 | A1* | 5/2012 | Kunzig | G06Q 10/087 235/385 |
| 2012/0191272 | A1* | 7/2012 | Andersen | G05D 1/0088 701/2 |
| 2012/0232961 | A1* | 9/2012 | Wellman | G05D 1/0282 705/7.38 |
| 2012/0239224 | A1* | 9/2012 | McCabe | B66F 9/063 701/2 |
| 2012/0303176 | A1* | 11/2012 | Wong | G01S 17/023 701/1 |
| 2012/0303255 | A1 | 11/2012 | Wong et al. | |
| 2013/0211977 | A1* | 8/2013 | Lyon | G06Q 10/0875 705/29 |
| 2014/0187258 | A1 | 7/2014 | Khorashadi et al. | |

FOREIGN PATENT DOCUMENTS

| | | |
|---|---|---|
| GB | 2406747 A | 4/2005 |
| JP | 2004280646 A | 10/2004 |
| JP | 2007310616 A | 11/2007 |

OTHER PUBLICATIONS

International Search Report and Written Opinion dated Jun. 18, 2015 pertaining to International Application No. PCT/US2014/05619.

International Search Report and Written Opinion dated Jan. 15, 2015 pertaining to International Application No. PCT/US2014/056189.

Office Action dated Nov. 19, 2015 pertaining to U.S. Appl. No. 14/488,659.

* cited by examiner

SYSTEMS, METHODS, AND MOBILE CLIENT DEVICES FOR SUPERVISING INDUSTRIAL VEHICLES

CROSS-REFERENCE TO RELATED APPLICATIONS

This application claims the benefit of U.S. Provisional Application No. 61/937,112 filed Feb. 7, 2014.

This application is related to Application No. ###, filed Month Day, Year, entitled "SYSTEMS AND METHODS FOR SUPERVISING INDUSTRIAL VEHICLES," and Application No. ###, filed Month Day, Year, entitled "SYSTEMS, METHODS, AND MOBILE CLIENT DEVICES FOR SUPERVISING INDUSTRIAL VEHICLES."

BACKGROUND

The present specification generally relates to systems and methods for showing information from a management server on a mobile client device and, more specifically, to systems and methods for showing information from a management server on a mobile client device to facilitate the management of industrial vehicles.

In order to move items about an industrial facility, workers often utilize industrial vehicles, including for example, forklift trucks, hand and motor driven pallet trucks, and/or other materials handling vehicles. Warehouse management systems can be implemented on a server to manage the movement of items about the industrial facility. However, disruptions in the operation of such industrial vehicles can impact the ability of a warehouse management system to obtain peak operating efficiency. Moreover, conventional warehouse management systems do not provide tools for showing information that can be effectively utilized to manage access to, and operation of, the available industrial vehicles within the facility in an efficient and integrated manner.

SUMMARY

In one embodiment, a system for supervising changing states of a plurality of industrial vehicles can include a management server, the industrial vehicles, and a mobile client device. The management server can include one or more server processors. Each of the industrial vehicles can include one or more vehicular processors, and can be communicatively coupled to the management server. The mobile client device can include a display, a wireless communication circuit, and one or more client processors. The mobile client device can be communicatively coupled to the management server. The one or more vehicular processors of each of the industrial vehicles execute vehicle functions to: (i) determine a localized position with respect to an inventory transit surface of an industrial facility; (ii) detect an operational characteristic; (iii) transmit vehicular data indicative of the localized position and the operational characteristic to the management server; and (iv) navigate along the inventory transit surface of the industrial facility to change a state of the plurality of industrial vehicles. The one or more server processors of the management server can execute server functions to: (i) determine based upon the vehicular data that an impact has occurred involving one of the industrial vehicles; and (ii) derive an impact descriptor indicative of the impact from the vehicular data. The wireless communication circuit of the mobile client device can receive the impact descriptor. The one or more client processors of the mobile client device can execute client functions to: (i) show a topographical warehouse object via the display of the mobile client device; (ii) show a vehicular object contemporaneously with the topographical warehouse object via the display of the mobile client device; and (iii) show an impact path object contemporaneously with the topographical warehouse object via the display of the mobile client device. The topographical warehouse object can include a geometric representation indicative of the inventory transit surface of the industrial facility. The vehicular object can be positioned with respect to the topographical warehouse object to indicate an impact position of the one of the industrial vehicles corresponding to the localized position of the one of the industrial vehicles at an occurrence of the impact. The impact path object can be indicative of movement of the one of the industrial vehicles from a pre-impact position to the impact position, from the impact position to a post-impact position, or from the pre-impact position to the post-impact position.

In another embodiment, a mobile client device for supervising changing states of a plurality of industrial vehicles can include a display, a wireless communication circuit, and one or more client processors. The mobile client device can be communicatively coupled to a management server. The management server can include one or more server processors. The management server can be communicatively coupled to the industrial vehicles. Each of the industrial vehicles can include one or more vehicular processors. The one or more vehicular processors of each of the industrial vehicles can execute vehicle functions to: (i) determine a localized position with respect to an inventory transit surface of an industrial facility; (ii) detect an operational characteristic; (iii) transmit vehicular data indicative of the localized position and the operational characteristic to the management server; and (iv) navigate along the inventory transit surface of the industrial facility to change a state of the plurality of industrial vehicles. The one or more server processors of the management server can execute server functions to: (i) determine based upon the vehicular data that an impact has occurred involving one of the industrial vehicles; and (ii) derive an impact descriptor indicative of the impact from the vehicular data. The wireless communication circuit of the mobile client device can receive the impact descriptor. The one or more client processors of the mobile client device can execute client functions to: (i) show a topographical warehouse object via the display of the mobile client device; (ii) show a vehicular object contemporaneously with the topographical warehouse object via the display of the mobile client device; and (iii) show an impact path object contemporaneously with the topographical warehouse object via the display of the mobile client device. The topographical warehouse object can include a geometric representation indicative of the inventory transit surface of the industrial facility. The vehicular object can be positioned with respect to the topographical warehouse object to indicate an impact position of the one of the industrial vehicles corresponding to the localized position of the one of the industrial vehicles at an occurrence of the impact. The impact path object can be indicative of movement of the one of the industrial vehicles from a pre-impact position to the impact position, from the impact position to a post-impact position, or from the pre-impact position to the post-impact position.

In a further embodiment, a method for supervising changing states of a plurality of industrial vehicles upon an inventory transit surface of an industrial facility can be implemented. The plurality of industrial vehicles can be in communication with a management server. The management server can be in communication with a mobile client device. The mobile client device can include a display, a wireless communication circuit, and one or more client processors. The method can include determining a localized position of each of the industrial vehicles with respect to the industrial facility. An operational characteristic of each of the industrial vehicles can be detected. The occurrence of an impact involving one of the industrial vehicles can be determined based upon the localized position and the operational characteristic of each of the industrial vehicles. Each of the industrial vehicles can be navigated upon the inventory transit surface of the industrial facility. An impact descriptor indicative of the impact of the one of the industrial vehicles can be received automatically with the wireless communication circuit of the mobile client device. A topographical warehouse object can be shown via the display of the mobile client device. The topographical warehouse object can include a geometric representation indicative of the inventory transit surface of the industrial facility. A vehicular object can be shown contemporaneously with the topographical warehouse object via the display of the mobile client device. The vehicular object can be positioned with respect to the topographical warehouse object to indicate an impact position of the one of the industrial vehicles corresponding to the localized position of the one of the industrial vehicles at an occurrence of the impact. An impact path object can be shown contemporaneously with the topographical warehouse object via the display of the mobile client device. The impact path object can be indicative of movement of the one of the industrial vehicles from a pre-impact position to the impact position, from the impact position to a post-impact position, or from the pre-impact position to the post-impact position.

According to any of the systems, mobile client devices, or methods described herein, the impact path object is presented statically or as an animation. Alternatively or additionally, the one or more client processors can execute the client functions to provide controls for manipulation of the animation.

According to any of the systems, mobile client devices, or methods described herein, the one of the industrial vehicles involved in the impact can be disabled after determining the impact has occurred. In some embodiments, the one or more vehicular processors of the one of the industrial vehicles can execute vehicle functions to disable the one of the industrial vehicles involved in the impact after the impact has occurred. Alternatively or additionally, an acknowledgement control can be presented, automatically with the one or more client processors of the mobile client device, via the display of the mobile client device. Input indicative of a desire to acknowledge the impact can be received with the acknowledgement control. The one of the industrial vehicles involved in the impact can be reactivated after the input is received with the acknowledgement control. In some embodiments, the one or more server processors of the management server can execute server functions to reactivate the one of the industrial vehicles involved in the impact after the input is received with the acknowledgement control.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
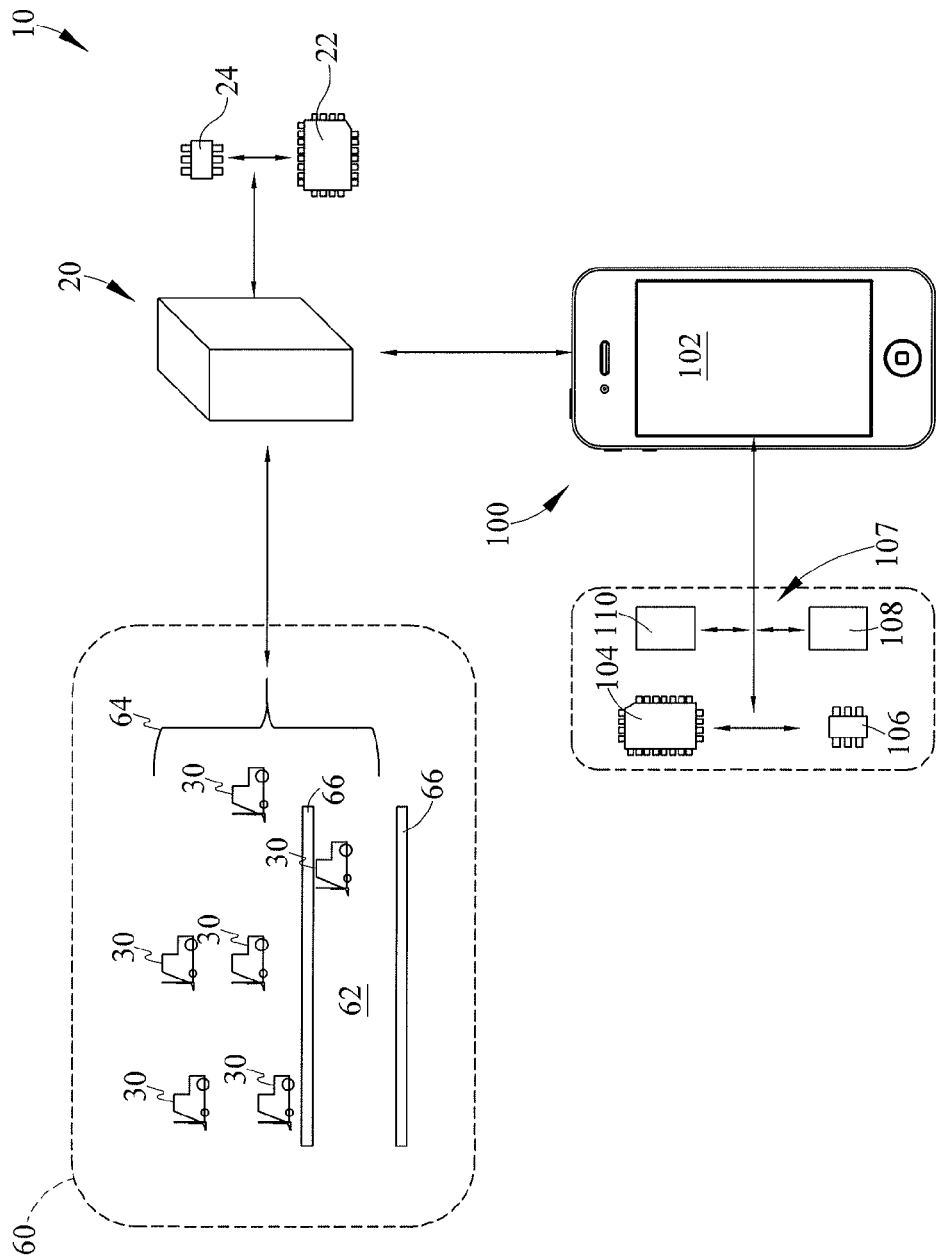
FIG. 1 schematically depicts a systems for showing information from a management server on a mobile client device according to one or more embodiments shown and described herein.

FIG. 1 generally depicts one embodiment of a system for showing information from a management server on a display of a mobile client device. The system generally comprises a management server, a plurality of industrial vehicles, and a mobile client device. The embodiments described herein can evolve such that one or more parameters of the plurality of industrial vehicles experience a variety of states over time. Each state can indicative of an instance of operation of the plurality of industrial vehicles. Various embodiments of the system and methods for operating the system will be described in more detail herein.

FIG. 1 schematically depicts a system 10 for showing information from a management server 20 on a mobile client device 100. In some embodiments, the system 10 can comprise a management server 20 for accessing and processing data indicative of one or more industrial vehicles 30. The management server 20 can comprise or be communicatively coupled to one or more server processors 22 and server memory 24. The one or more server processors 22 and server memory 24 can be communicatively coupled to each other. As used herein, the phrase "communicatively coupled" means that components are capable of exchanging data signals with one another such as, for example, electrical signals via conductive medium, electromagnetic signals via air, optical signals via optical waveguides, or the like.

In the embodiments described herein, the one or more server processors 22 and server memory 24 may be integral with the management server 20. However, it is noted that each of the one or more server processors 22 and server memory 24 may be a discrete components communicatively coupled with one another without departing from the scope of the present disclosure. For example, the management server 20 can be communicatively coupled to one or more back-end servers and/or data resource, e.g., one or more databases, data stores or other sources of information. Accordingly, the management server 20 can be scaled for variously sized enterprises. For example, a relatively small enterprise can utilize a single level of servers for a single facility. In another example, a global enterprise can be established whereby a global level of servers manages multiple facilities by communicating with one or more levels of servers that service each of the facilities. The global level can manage data such that data instances from each facility can be selectively segregated and distributed.

For the purpose of defining and describing the present disclosure, it is noted that the term "processor" generally means a device that executes functions according to machine readable instructions or that has been configured to execute functions in a manner analogous to machine readable instructions such as, for example, an integrated circuit, a microchip, a computer, a central processing unit, a graphics processing unit, field-programmable gate array (FPGA), an application-specific integrated circuit (ASIC), or any other computation device. Additionally, it is noted that the term "memory" as used herein generally means one or more apparatus capable of storing data or machine readable instructions for later retrieval such as, but not limited to, RAM, ROM, flash memory, hard drives, or combinations thereof.

It is furthermore noted that the machine readable instructions described herein may comprise logic or algorithms written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as implemented via either an FPGA configuration or an ASIC, or their equivalents.

Figure 2:
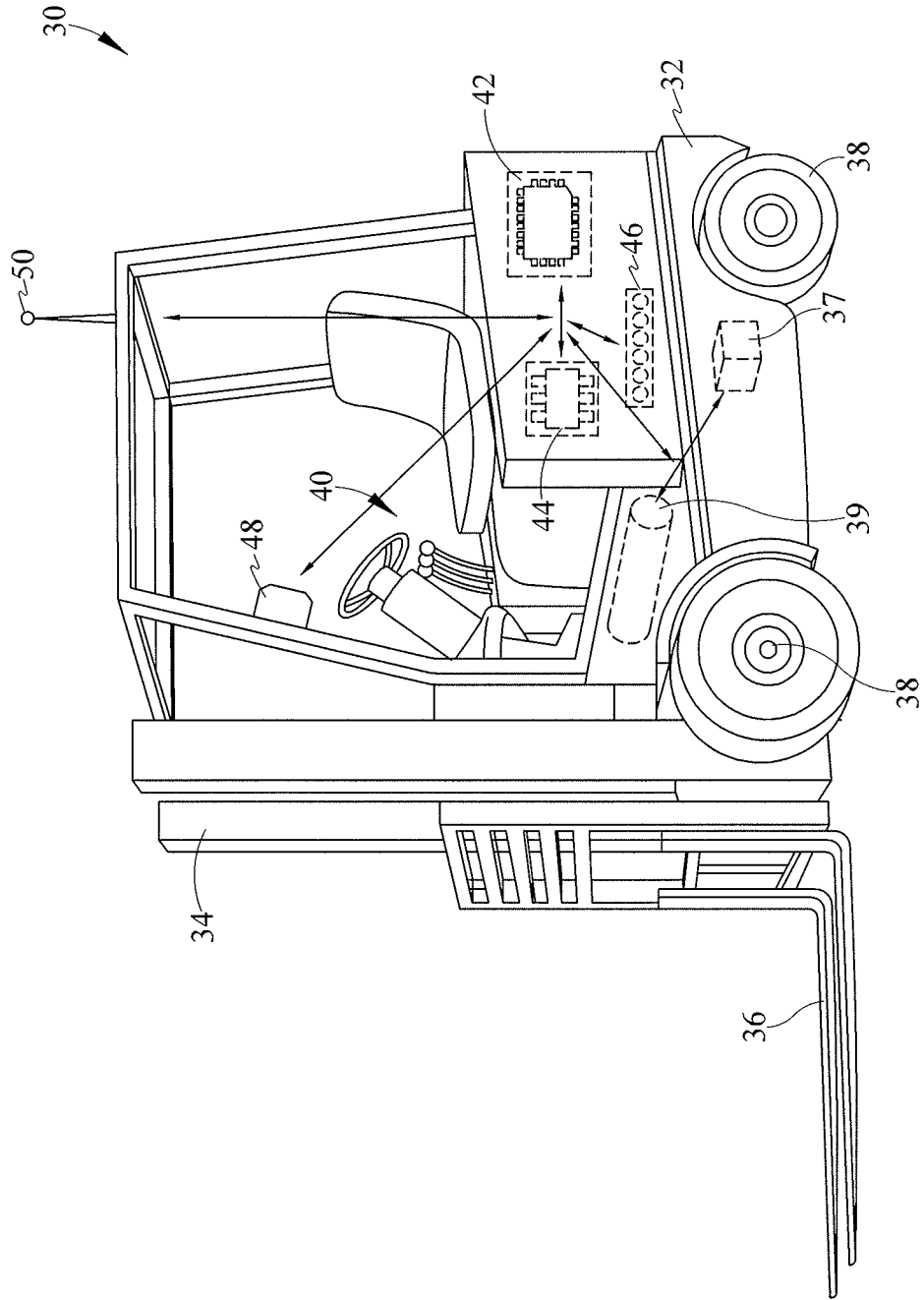
FIG. 2 schematically depicts an industrial vehicle according to one or more embodiments shown and described herein.
Figure 3:
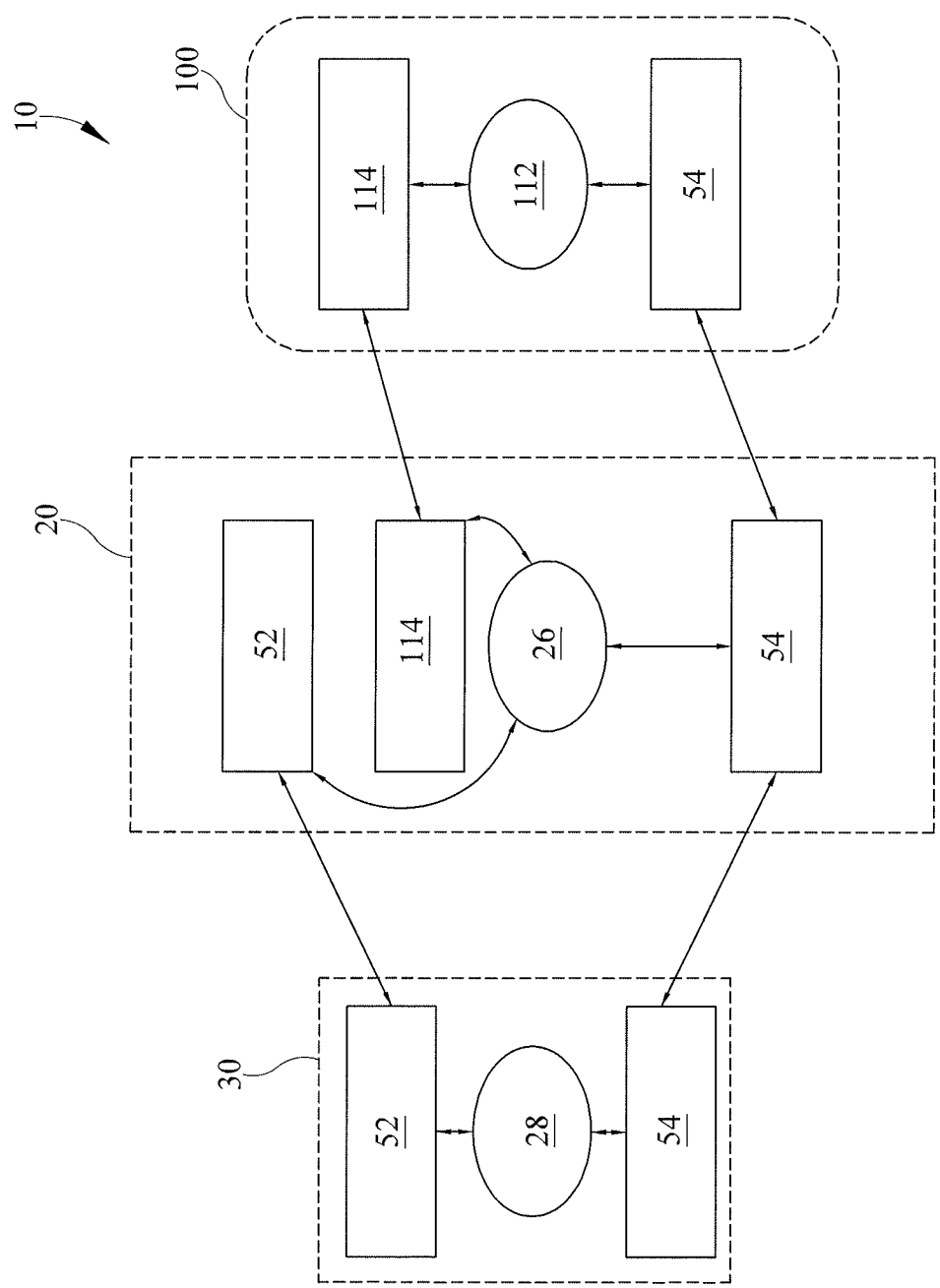
FIG. 3 schematically depicts a data flow diagram for systems for showing information from a management server on a mobile client device according to one or more embodiments shown and described herein.

Referring collectively to FIGS. 1-3, embodiments of an industrial vehicle 30 are schematically depicted. The industrial vehicle 30 can be any vehicle that is configured to determine and communicate localization information, i.e., information regarding the position of the industrial vehicle 30 with respect to an environment. The industrial vehicle 30 can comprise a vehicle 32 for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. Accordingly, the vehicle 32 can comprise a mast 34 that extends in a substantially vertical direction and forks 36 operable to travel along the mast to raise and lower in a substantially vertical direction. In some embodiments, the forks 36 can be configured to travel laterally to adjust the position of the forks laterally with respect to the mast 34 or one another. Motive force can be applied to actuate the forks via a mechanical system, a hydraulic system, an electrical system, a pneumatic system or a combination thereof. Alternatively or additionally, the vehicle 32 can comprise components for applying a clamping force to a payload (e.g., barrels, kegs, paper rolls and/or the like).

The vehicle 32 can further comprise one or more wheels 38 for traversing along a surface to travel along a desired path. Accordingly, the vehicle 32 can be directed forwards and backwards by rotation of the one or more wheels 38. Additionally, the vehicle 32 can be caused to change direction by steering the one or more wheels 38. Optionally, the vehicle 32 can comprise operator controls 40 for controlling functions of the vehicle 32 such as, but not limited to, the position of the forks 36, the rate of travel of the forks 36, the speed of the wheels 38, the orientation of the wheels 38, or the like. The operator controls 40 can comprise controls that are assigned to functions of the vehicle 32 such as, for example, switches, buttons, levers, handles, pedals, input/output device, or the like.

The industrial vehicle 30 can further comprise one or more vehicular processors 42 for executing vehicle functions 28 e.g., of the vehicle 32 according to machine readable instructions. The industrial vehicle 30 can further comprise vehicular memory 44 communicatively coupled to the one or more vehicular processors 42. As is explained in greater detail herein, the industrial vehicle 30 can comprise additional modules communicatively coupled to the one or more vehicular processors 42 (generally indicated by arrows). Such modules of the industrial vehicle 30 can be communicatively coupled via any wired or wireless bus that can comprise a controller area network (CAN) bus, ZigBee, Bluetooth, Local Interconnect Network (LIN), time-triggered data-bus protocol (TTP) or other suitable communication strategy. Accordingly, the one or more vehicular processors 42 of the industrial vehicle 30 can execute machine readable instructions to cause vehicle functions 28 to be performed automatically. Thus, each function of the operator controls 40 of the vehicle 32 can be augmented or replaced through operation of the one or more vehicular processors 42. As a result, in some embodiments, the industrial vehicle 30 can be configured as an automated guided vehicle (AGV).

The industrial vehicle 30 can further comprise a sensor system 46 for collecting information associated with the vehicle 32. Specifically, the sensor system 46 can comprise a plurality of sensors each operable to collect feedback indicative of a state of the industrial vehicle 30, environmental conditions surrounding the industrial vehicle 30, or the like. Accordingly, the sensor system 46 can comprise any sensor capable of detecting a quantity indicative of a state of the industrial vehicle 30 or the environmental conditions surrounding the industrial vehicle 30 such as, for example, laser scanners, laser range finders, encoders, pressure transducers, cameras, radio frequency identification (RFID) detectors, optical detectors, cameras, ultrasonic range finders, accelerometers, volt meters, amp meters, resistance detectors, or the like. The sensors of the sensor system 46 can be positioned at any location within or about the industrial vehicle 30. Generally, the positioning of sensors is dependent upon the quantity being detected by the sensor, i.e., the sensor can be advantageously positioned such that the quantity being detected is likely to be within the detection range of the sensor.

In some embodiments, the sensor system 46 can be communicatively coupled to the one or more vehicular processors 42, the vehicular memory 44, or both. Accordingly, the one or more vehicular processors 42 can receive sensor data from the sensor system 46. The sensor data can be processed by the sensor system 46 prior to transmission to the one or more vehicular processors 42. Alternatively or additionally, the sensor data can be processed by the one or more vehicular processors 42 after the sensor data is received.

Referring still to FIGS. 1-3, the industrial vehicle 30 can further comprise an operator identification system 48 coupled to the industrial vehicle and operable to detect the presence of an operator. The operator identification system 48 can be communicatively coupled to the one or more vehicular processors 42. In some embodiments, the vehicle functions 28 can automatically cause the operator identification system 48 to detect the identity of an operator. Specifically, the operator identification system 48 can comprise an identification reader for detecting information stored upon a portable object associated with an operator. For example, the operator identification system 48 can comprise a magnetic card reader or a radio frequency identification reader that detects an encoded identification card carried by the operator. Alternatively or additionally, the operator identification system 48 can be configured to detect biological information such as, for example, fingerprint scanner, retinal scanner, facial detection or the like.

Upon the collection of identification data by the operator identification system 48, an operator association between the industrial vehicle 30 and the identification data can be created by the vehicle functions 28. In some embodiments, the association can be created by including the identification data with vehicular data 52 that is transmitted from the industrial vehicle 30 via the communication circuit 50. Such an association can be extracted from the vehicular data 52 with identifying indicia of the industrial vehicle 30 by server functions 26. As is described in greater detail below, the operator identification system 48 can be utilized to facilitate operator authorization, training management and/or operator license/certification management.

In one aspect the present disclosure relates to a mobile client device 100, as described herein. Referring again to FIG. 1, embodiments of a mobile client device 100 are schematically depicted. The mobile client device 100 may be configured as a cellular or mobile telephone, a tablet device, or the like with functionality for wireless data communications. Thus, while the mobile client device 100 is depicted herein as a mobile telephone, it should be understood that the mobile client device 100 can be any mobile communications device that can exchange data via a mobile telecommunication service such as, for example, a personal digital assistant, a smart phone, or a laptop computer with a wireless communication peripheral. Accordingly, in some embodiments, the mobile client device 100 can be a device that executes a mobile operating system. The mobile operating system can be any operating system designed primarily for touch screen mobile devices such as, for example, Android, iOS, Blackberry OS, Windows Phone, MP WebOS, Symbian OS, Palm OS, or the like.

The mobile client device 100 can comprise a display 102 for emitting optical signals to show images. The display 102 can be communicatively coupled to the one or more client processors 104, the client memory 106, or both. The display 102 can comprise any medium capable of transmitting an optical output such as, for example, a cathode ray tube, light emitting diodes, liquid crystal displays, plasma displays, or the like. The display 102 can also be configured as a touch screen that, in addition to providing optical information, detects the presence and location of a tactile input upon a surface of or adjacent to the display 102. Accordingly, the display 102 can receive mechanical input directly upon the optical output provided by the display 102.

The mobile client device 100 can comprise one or more wireless communication circuits 107 for communicating data wirelessly. The one or more wireless communication circuits 107 can comprise a cellular communication circuit 108 for transmitting and receiving information via a cellular network. The cellular communication circuit 108 can be communicatively coupled to the one or more client processors 104, the client memory 106, or both. The cellular communication circuit 108 can include the necessary hardware to encode data and decode data for communication via a suitable cellular network. Accordingly, the cellular communication circuit can comprise cellular modem module and cellular transceiver module. Suitable cellular networks include, but are not limited to, technologies such as GPRS, EDGE, LTE, UMTS, CDMA, GSM, or the like. In some embodiments, the cellular communication circuit 108 can be utilized to communicate data via the Internet or World Wide Web.

The one or more wireless communication circuits 107 of the mobile client device 100 can comprise a network communication circuit 110 for transmitting and receiving information via a local area network, a personal area network, or the like. The network communication circuit 110 can be communicatively coupled to the one or more client processors 104, the client memory 106, or both. The network communication circuit 110 can include the necessary hardware to encode data and decode data for communication via a local area network or a personal area network, which are described in greater detail above. Accordingly, the mobile client device 100 can utilize the network communication circuit 110 to communicate data via the Internet or World Wide Web.

Referring still to FIG. 1, the embodiments described herein include a system 10 for showing information from the management server 20 on the display 102 of the mobile client device 100. In one aspect, the present disclosure relates to a management server 20, as described herein. The management server 20 can be communicatively coupled to a plurality of industrial vehicles 30 and the mobile client device 100. Specifically, each of the industrial vehicles 30 can travel upon an inventory transit surface 62 of an industrial facility 60 such as, for example, a warehouse, a manufacturing facility, or any enclosure that houses payloads. It is noted that the term "inventory transit surface" can be used herein to denote any surface suitable for the operation of industrial vehicles 30. The plurality of industrial vehicles 30 can be communicatively coupled to the communication portal 64 of the industrial facility 60, which can in turn be communicatively coupled to the management server 20.

Referring collectively to FIGS. 1-3, the management server 20 can execute machine readable instructions to perform server functions 26. The server functions 26 can automatically aggregate, process and distribute data associated with each of the industrial vehicles 30. The data associated with each of the industrial vehicles 30 can be processed by the server functions in order to define one or more states of the plurality of industrial vehicles 30 collectively. In some embodiments, the data can be synchronized such that the state is indicative of the plurality of industrial vehicles 30 collectively at an instance of time or period of time. Accordingly, the management server 20 can facilitate the automatic functions of the industrial vehicles 30 such as, for example, navigation, movement and tracking of payloads, or the like. For example, the management server 20 can be configured to assist with the automated navigation of the industrial vehicles 30. In one embodiment, the management server 20 can store in the server memory 24 map data that is associated with the industrial facility 60. The map data can be completely or partially shared with the industrial vehicles 30 via the communication portal 64.

Referring again to FIG. 1, the embodiments described herein can comprise the management server 20 communicatively coupled with the wireless communication circuit 107 of the mobile client device 100. For example, in some embodiments the cellular communication circuit 108 of the mobile client device 100 can be communicatively coupled to the management server 20. Specifically, the cellular communication circuit 108 can exchange data with one or more cellular towers. The one or more cellular towers can be communicatively coupled to a gateway that acts as an intermediary for the data to be transmitted, received, or both via the Internet or World Wide Web. Alternatively or additionally, the network communication circuit 110 of the mobile client device 100 can be communicatively coupled to the management server 20 via the Internet or World Wide Web.

Navigation

Each of the industrial vehicles 30 can automatically perform vehicle functions 28 by executing vehicle centric machine readable instructions (i.e., machine readable instructions that are executable at the vehicle level) with the one or more vehicular processors 42. Accordingly, the industrial vehicle 30 can automatically collect data via the sensor system 46, the operator identification system 48, or both. The industrial vehicle can also automatically exchange data with the management server 20. Moreover, the vehicle centric machine readable instructions can include logic for performing vehicle functions 28 that involve the analysis of data and the manipulation of the industrial vehicle 30. For example, the industrial vehicle 30 can determine a localized position of the industrial vehicle 30 with respect to the industrial facility 60. The determination of the localized position of the industrial vehicle 30 can be performed by comparing sensor data or data extracted from the sensor data (e.g., via feature extraction functions executed by the one or more vehicular processors 42) to map data. The map data can be stored locally in the vehicular memory 44, which can be updated periodically by the management server 20, or map data of the management server 20.

In some embodiments, the industrial vehicle 30 can automatically navigate along the inventory transit surface 62 to a desired position from the localized position of the industrial vehicle 30. Given the localized position and the desired position, a travel path can be determined for the industrial vehicle 30. In some embodiments, the industrial vehicle 30 can determine the travel path from sensor data and map data. In some embodiments, the management server 20 can collect the localized position of each of the industrial vehicles 30 and disseminate such information to assist with the determination of the travel path. Specifically, the industrial vehicle can use the disseminated localized positions as input to the travel path determination function. Alternatively or additionally, the management server 20 can provide the industrial vehicle 30 with the travel path based at least in part upon the collected localized position of each of the industrial vehicles 30. In some embodiments, the collected localized positions can be captured to represent states of the industrial vehicles 30 as one or more of the industrial vehicles 30 travels upon the inventory transit surface 62.

Once the travel path is known, the industrial vehicle 30 can travel along the travel path to navigate the inventory transit surface 62 of the industrial facility 60. Specifically, the one or more vehicular processors 42 can execute vehicle centric machine readable instructions to operate the industrial vehicle 30. In one embodiment, the one or more vehicular processors 42 can adjust the steering of the wheels 38 and control the throttle to cause the industrial vehicle 30 to navigate the inventory transit surface 62. It should be appreciated that the industrial facility 60 is a substantially dynamic environment, i.e., the localized position of the industrial vehicles 30, the location of payloads, the industrial facility or the like change over time. Accordingly, the determination of localized positions and travel paths may need to be repeatedly performed periodically with a time constant sufficient to keep with the pace of changing states of industrial vehicles 30.

Vehicular Data

Referring still to FIGS. 1-3, the industrial vehicle 30 can detect various operational characteristics with the sensor system 46. The operational characteristics can be collected as input and feedback for the functions of the industrial vehicle 30 and the management server 20. Below is a description of various vehicle functions 28 and some operational characteristics with the named function. It is noted that the listing is provided for clarity and is not intended to be exhaustive. For localization, the operational characteristics can include data indicative of image data of the industrial facility 60, ranges to detected objects, encoder data of the wheels 38, RFID data from landmarks, laser encoder data of landmarks, or the like. For navigation, the operational characteristics can include data indicative of velocity of the industrial vehicle 30, encoder data of the wheels 38, battery 37 electrical parameters (e.g., voltage, current, etc.), battery 37 removal data, steering position, or the like. For moving payload, the operational characteristics can include data indicative of the position or height of the forks 36 relative to the mast 34, electrical parameters of the battery 37, or the like. For life span monitoring or consumable monitoring, the operational characteristics can include data indicative of usage parameters of the industrial vehicle 30 or components thereof collected by the sensor system 46. The usage parameters can comprise time data, distance data, quantity data (e.g., fluid volumes, etc.), or the like. Accordingly, exemplary usage parameters can comprise a traction system hour meter, a travel usage hour meter, a hydraulic usage hour meter, a steering usage hour meter, operator usage hour meter, or the like.

As is noted above, the management server 20 can operate as an aggregator of vehicular data 52 from each of the industrial vehicles 30. It is noted that the term "vehicular data" can mean data originating from an industrial vehicle 30. Accordingly, vehicular data 52 can include any data generated by the vehicular processor 42, stored in the vehicular memory 44, detected by the sensor system 46, or detected by the operator identification system 48. The vehicular data 52, which can comprise data indicative of the localized position and one or more operational characteristic, can be transmitted by the communication circuit 50 of the industrial vehicle 30 to the management server 20 via the communication portal. In some embodiments, the vehicular data 52 can be indexed to allow the vehicular data 52 from each of the industrial vehicles 30 to be synchronized to collectively represent one or more states of the industrial vehicles 30.

Descriptor Data

In some embodiments, the server functions 26 can access the vehicular data 52 using the one or more server processors 22, the server memory 24, or combinations thereof. In some embodiments, the management server 20 can act as a pass thru entity that extracts the descriptors from the vehicular data 52 and transmits the descriptor data 54. Alternatively or additionally, the server functions 26 of the management server 20 can transform the vehicular data 52 into the descriptor data 54. Accordingly it should be understood that the server functions 26 can translate the vehicular data into a desired form for transmission as the descriptor data 54. Such translation can vary from merely copying data to more complex processing requiring particularized algorithms for deriving the appropriate data type or deriving conclusions from the vehicular data 52, or the like. Alternatively or additionally, the vehicular data 52 can be indexed to allow the descriptor data 54 to be synchronized to collectively represent one or more states of the industrial vehicles 30.

The descriptor data 54 can include a location descriptor, an operational descriptor, an operator descriptor, a map descriptor, a productivity descriptor or combinations thereof. The location descriptor can be indicative of the localized position of one or more of the industrial vehicles 30. As is noted above, the management server 20 can aggregate vehicular data 52 indicative of the localized position of one or more (preferably two or more) of the industrial vehicles 30. Accordingly, the location descriptor can be copied directly from the vehicular data 52 by the server functions 26, or can be derived by the server functions 26 from the vehicular data 52. The vehicular data 52 can also comprise data indicative of the operational characteristics of one or more (preferably two or more) of the industrial vehicles 30, the operator characteristics associated with one or more (preferably two or more) of the industrial vehicles 30, the vehicle map data of one or more (preferably two or more) of the industrial vehicles 30, or combinations thereof. Analogous to the location descriptor, the server functions 26 can copy or derive the operational descriptor from the operational characteristics of the vehicular data 52, the operator descriptor from the operator characteristics of the vehicular data 52, the map descriptor from the vehicle map data of the vehicular data 52, the productivity descriptor from the operational characteristics of the vehicular data 52, or combinations thereof.

In some embodiments, the management server 20 can maintain operator descriptors that can be associated with the identification data. The operator descriptors can comprise operator certification information, training data, a list of authorized users associated with the industrial vehicle 30, or the like. The operator descriptors may be administered by server functions 26 of the management server 20, which can build, modify, or maintain the operator descriptors. The server functions 26 may build or modify the operator descriptors upon a manually initiated process. Alternatively or additionally, the server functions 26 may periodically build or modify the descriptors, such as, based upon the detection of predetermined events including changes in the status of operators or vehicles, based upon predetermined intervals, or based upon other conditions or circumstances.

In some embodiments, an operator can be required to be verified as an authorized user prior to operating the industrial vehicle 30. The industrial vehicle 30 can be prevented from operating unless or until the identification data is authenticated as corresponding to an authorized user based upon descriptor data 54. As still further examples, an operator may be authorized to operate only specific types, classes, etc., of vehicles 32. Specifically, an operator may be authorized to operate sit-down counter balanced forklift trucks, but not rider reach trucks. Accordingly, that operator may be an authorized user only in lists associated with sit-down counter balanced forklift trucks. Still further, an operator may be authorized only for specific vehicles within a given type or class of vehicle. As an example, an operator may only be authorized to operate a specific forklift truck, which is identified by a specific unique identifier such as a serial number. Accordingly, that operator would only be an authorized user for a list associated with the corresponding forklift truck having the associated serial number. Other factors, such as time, day, date, etc., may also be considered. For example, the end of a work shift could automatically trigger server functions 26 that rebuild the lists of authorized users corresponding to operators working the new shift. As yet a further example, lists of authorized users may be adjusted based upon obtained/updated certifications, training, or the like.

Alarm Descriptors

In some embodiments, the vehicle functions 28 can automatically compare vehicular data 52 with predetermined values or rules to create an alarm. Accordingly, the alarm can be included with the vehicular data 52 that is reported to the management server 20. Alternatively or additionally, the server functions 26 can automatically compare vehicular data 52 with predetermined values or rules to create an alarm descriptor for inclusion in the descriptor data 54. Exemplary alarms or alarm descriptors can be indicative of inspection notifications, due planned maintenance, emergency operations, low battery status, certification expiration of operators, impacts, or the like. The alarm descriptors can be pushed to the mobile client device 100 or pulled from the management server 20.

Accordingly, as is explained in greater detail below, alarm descriptors can be utilized to instantiate notifications upon the display 102 of the mobile client device 100. Thus, the client functions 112 can automatically utilize the display 102 of the mobile client device 100 to show visual information indicative of the alarms. Further, depending upon the specific implementation, the mobile client device 100 can receive input to acknowledge alarms and/or add annotations or other comments. The input can be transmitted to the management server 20 as client data 114 for use by the server functions to clear or annotate alarms.

In some embodiments, alarms or alarm descriptors indicative of certification expiration of operators can be determined from identification data, operator descriptors, or combinations thereof. Specifically, the operator descriptors can comprise information indicative of operator certificates, training requirements or the like. The server functions 26 can automatically compare the operator descriptors to rules and requirements. Should the rules be violated, an alarm descriptor can be generated by the server functions 26. For example, an alarm descriptor can indicate that the certification associated with an instance of the identification data has expired or is set to expire at a specified point in the future.

Referring still to FIGS. 1-3, alarms or alarm descriptors indicative of impacts can be determined from operational characteristics, localized position, or combinations thereof. In some embodiments, the sensor system 46 can automatically collect operational characteristics suitable for impact detection such as, for example, positive or negative acceleration of the industrial vehicle 30, force applied to the industrial vehicle 30, excessive braking, travel of the industrial vehicle 30 that breaks designated traffic rules (e.g., incorrect way on one way aisle), or the like.

In some embodiments, the vehicle functions 28 can automatically compare the detected operational characteristics with predetermined values for the operational characteristics (e.g., directional data, magnitudes, rate of change, rolling averages, or the like). When the operational characteristics suitable for impact detection indicate non-compliance with the predetermined values, the vehicle functions 28 can determine that an impact has occurred. In some embodiments, the vehicle functions 28 can classify the severity of the detected impact based upon the magnitude of the non-compliance with the predetermined values. The detection and classification of severity of the impact can be included in the vehicular data 52 that can be communicated to the management server 20. In some embodiments, it may be desirable to implement appropriate post impact actions, such as lockout operations. In further embodiments, impact detection can be performed by the server functions 26 based upon aggregated vehicular data 52.

Productivity Descriptors

According to the embodiments described herein, the server functions 26 of the management server 20 can manipulate the vehicular data 52 to generate productivity descriptors. The productivity descriptors can be indicative of statistics derived from operational characteristics, which can include usage parameters. Specifically, the productivity descriptors can be utilized to summarize information useful for life span monitoring or consumable monitoring. The productivity descriptors can be utilized to generate reports related to vehicle or consumable usage rates (change over time, distance, or the like), which may be utilized for establishing cost of ownership, utilization statistics, etc. In addition to measuring usage in terms of rate, other measurement metrics related to usage can alternatively be used without departing from the scope of the embodiments described herein. For example, to measure usage of a bearing for a rotating shaft, the number of shaft rotations could indicate usage. As another example, for a hydraulic pump, the cumulative gallons of fluid pumped may be an indication of usage. However, knowing the average revolutions per minute for the rotating shaft or the average gallons per minute pumped by the pump allows the usage of these example devices to be monitored in terms of time.

Figure 4:
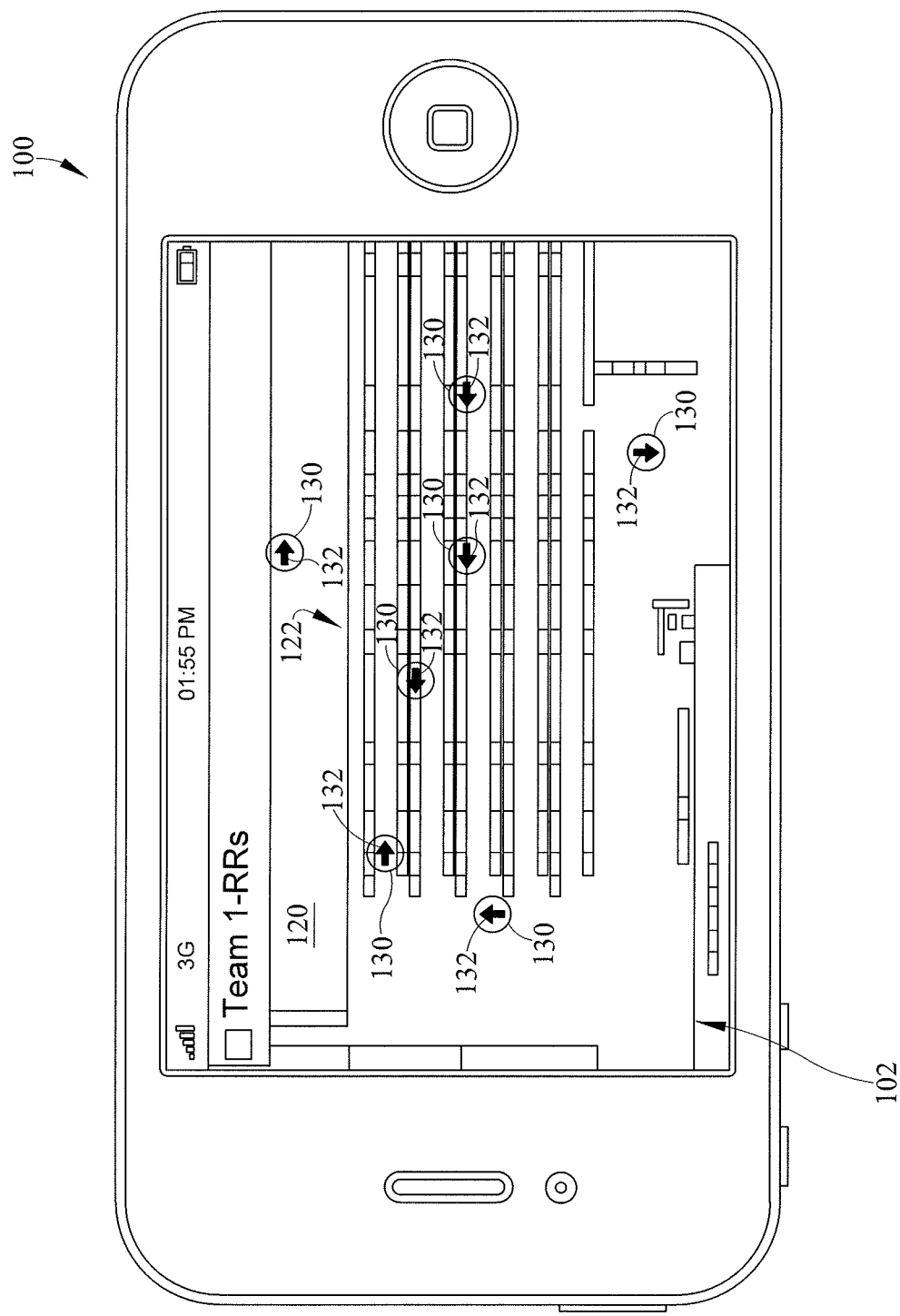
FIGS. 4-9 schematically depict mobile client devices according to one or more embodiments shown and described herein.

Referring collectively to FIGS. 1, 3 and 4, the descriptor data 54 can be transmitted from the management server 20 and received by the wireless communication circuit 107 of the mobile client device 100. The descriptor data 54 can be generated by server functions 26 and include descriptors indicative of the vehicular data 52 aggregated by the management server 20. Accordingly, the descriptor data 54, which can include map descriptors indicative of the inventory transit surface 62 of the industrial facility 60 and location descriptors indicative of the localized position of one or more (preferably two or more) of the industrial vehicles 30, can be accessed by the client functions 112.

The client functions 112 can comprise showing the topographical warehouse object 120 via the display 102 of the mobile client device 100. In some embodiments, the client functions 112 can utilize the map descriptors to generate a topographical warehouse object 120 that is indicative of the inventory transit surface 62 of the industrial facility 60. Accordingly, as used herein, the term "topographic warehouse object" can mean a visual representation of the inventory transit surface 62 as depicted on the display 102. Alternatively or additionally, the client functions 112 can utilize client data 114 to generate the topographical warehouse object 120. Accordingly, it should be understood that the topographical warehouse object 120 can be generated using only client data 114 (e.g., map data stored in the client memory 106), only map descriptors, or some combination thereof. Optionally, the management server 20 can be configured to automatically push map descriptors to the mobile client device 100 or the mobile client device 100 can be configured to pull map descriptors from the management server 20. This can be especially beneficial in embodiments where the inventory transit surface 62 or features of the industrial facility 60 might change states over time.

The topographical warehouse object 120 can comprise a geometric representation of the inventory transit surface 62. In some embodiments, the geometric representation can be scaled to the inventory transit surface 62, i.e., one or more dimensions of the geometric representation of the topographical warehouse object 120 can be proportionate to one or more dimension of the inventory transit surface 62. The topographical warehouse object 120 can further comprise structural objects 122 indicative of structural components 66 of the industrial facility 60, which can include structures for storing goods, structures that the industrial vehicles 30 navigate around, or the like. In some embodiments, the structural objects 122 can be scaled according to the structural components 66 of the industrial facility 60. Accordingly, the topographical warehouse object 120 can provide a scaled representation of the industrial facility 60 that includes the desired amount of detail of structural components 66.

The client functions 112 can further comprise showing a plurality of vehicular objects 130 contemporaneously with the topographical warehouse object 120 via the display 102 of the mobile client device 100. It is noted that the term "vehicular object" can mean the visual representation of an industrial vehicle 30. Each of the vehicular objects 130 can be positioned with respect to the topographical warehouse object 120 based at least in part upon one or more (preferably two or more) location descriptor. In some embodiments, each vehicular object 130 can be positioned according to an association with one of the industrial vehicles 30. The positioning of the vehicular objects 130 with respect to the topographical warehouse object 120 can represent a state of the industrial vehicles 30. Moreover, the positioning can be updated to represent additional states of the industrial vehicles. Generally, each vehicular object 130 can be associated with an industrial vehicle 30 and the location descriptors can provide localized position data associated with each of the industrial vehicles 30. Accordingly, each localized position can be associated with the vehicular object 130 based upon the association with the industrial vehicle 30. In some embodiments, the association can be provided by information transmitted with the vehicular data 52. Alternatively, the association can be determined at the management server 20 level.

Referring still to FIGS. 1, 3 and 4, location descriptors can be updated periodically via push or pull updates to provide changing localized position data. Accordingly, the vehicular objects 130 can change position with respect to the topographical warehouse object 120 based upon the updates of the location descriptors. In embodiments with frequent updates, the vehicular objects 130 can be shown on the display 102 as animated objects that travel with respect to the topographical warehouse object 120 in a manner that mimics the motion of the industrial vehicles 30 with respect to the inventory transit surface 62 of the industrial facility. Furthermore, in embodiments with low latency between the observation of the localized position of the industrial vehicle 30 and the provision of the localized position data to the client functions 112, movement of the vehicular objects 130 with respect to the topographical warehouse object 120 can be utilized to observe the position of the industrial vehicles in near real-time. Yet, it is noted that the use of the mobile client device 100 increases the latency between the occurrence of a state of the industrial vehicles 30 with respect to the inventory transit surface 62 and the representation of the state on the display 102. For example, the communication of the state from the industrial vehicles 30, to the management server 20, and to the mobile client device can result in a relatively large time delay with respect to real-time.

Encoded Objects

Alternatively or additionally, each of the vehicular objects 130 can be encoded based at least in part upon one or more operational descriptor of the descriptor data 54. Accordingly, the encoding can visually express information indicative of the operational characteristics of the industrial vehicle 30 via the display 102 of the mobile client device 100. In some embodiments, the vehicular object 130 can comprise an encoded object 132 that is encoded based upon an operational descriptor, which can be copied directly from or derived from one or more operational characteristic of the vehicular data 52. Accordingly, the encoded object generally comprises a visual characteristic indicative of the operational descriptor. Suitable visual characteristics include, but are not limited to, shapes, color coding, alphanumeric codes, charts, symbols, or the like. Applicants have discovered that the latency caused by the communication of the state is overcome by the representation of the state via showing the topographical warehouse object 120, the vehicular objects 130, and the encoded object 132 on the display 102. Specifically, the combination of the topographical warehouse object 120, the vehicular objects 130, and the encoded object 132 can provide a readily interpreted summary of the state in near real-time such that corrective action can be taken quickly enough to mitigate the negative impact of latency. Accordingly, the industrial vehicle 30 can be more readily supervised via the display 102 of the mobile client device 100 despite latency caused by the communication of the state to the mobile client device 100.

For example, in some embodiments, the encoded object 132 can be shaped to indicate the direction that the industrial vehicle 30 associated with the vehicular object is moving. Specifically, the encoded object 132 depicted in FIG. 4 is substantially shaped like an arrow that is pointing in a direction with respect to the topographical warehouse object 120. In embodiments, where the orientation of the topographical warehouse object 120 with respect to the inventory transit surface 62 is known, the direction of the encoded object can be substantially aligned with the heading of the industrial vehicle 30 with respect to the inventory transit surface. In some embodiments, the heading of the industrial vehicle 30 can be determined by a vehicle function. Alternatively or additionally, the heading can be derived from the vehicular data 52 by the server functions 26, or from the descriptor data 54 by the client functions 112.

Figure 5:
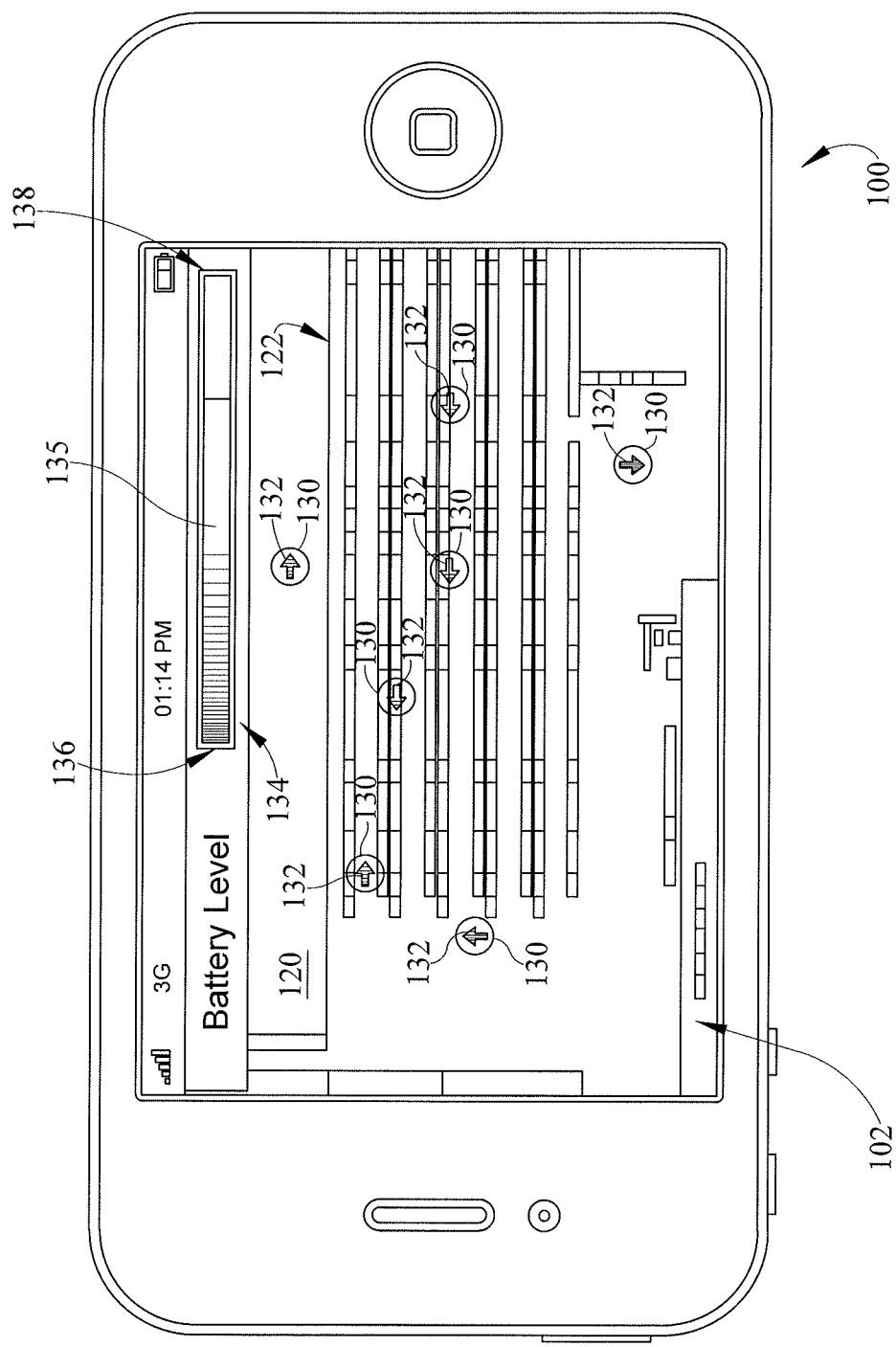
Figure 6:
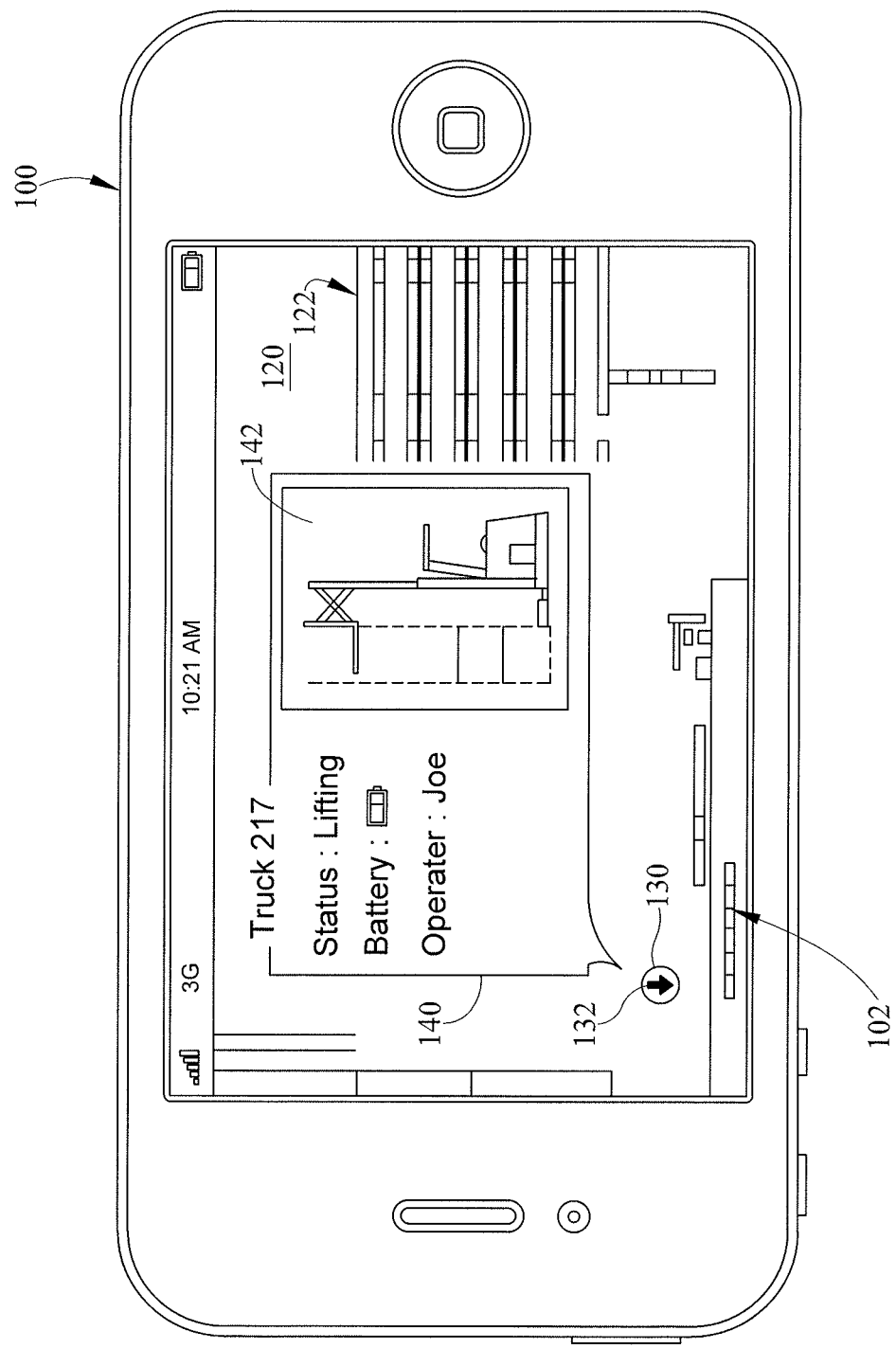

Referring collectively to FIGS. 1, 3 and 5, in some embodiments, the encoded object 132 of the vehicular object can be color coded. Color coding can be based at least in part upon one or more operational descriptor of the descriptor data 54. As is noted above, the industrial vehicle 30 can comprise one or more system that has a finite life span (e.g., industrial vehicle life span, mileage life span, traction system life span, hydraulic system life span, steering system life span, or the like) or a consumable having a finite amount (e.g., battery level, hydraulic fluid level, operator shift period, or the like). The color code can be configured to indicate an absolute level, a percentage consumed, a percentage remaining, or the like.

For example, the client functions 112 can automatically show a consumable scale 134, contemporaneously with the encoded object 132, via the display 102 of the mobile client device 100. The consumable scale 134 can comprise a color gradient 135 having a first end 136 and a second end 138. The color gradient 135 of the consumable scale 134 can vary from the first end 136 to the second end 138 such that the color gradient 135 corresponds to varying levels of the consumable. In one embodiment, the first end 136 can correspond to a relatively low amount of battery power and the second end 138 can correspond to a relatively high amount of power. Accordingly, the colors of the color gradient 135 can correspond to amounts of power between the relatively low amount of battery power of the first end 136 and the relatively high amount of power of the second end 138. Thus, the encoded object 132 can be colored according to one of the colors of the color gradient 135 to quantify the amount of battery power of the industrial vehicle 30 associated with the encoded object 132. Alternatively, the encoded object 132 of the vehicular object 130 can be encoded directly (e.g., alphanumeric code, chart, or the like) without the consumable scale 134. The encoded object 132 can be shown for one of the vehicular objects 130 on the display 102, or may be shown simultaneously for two or more (e.g. for all) of the vehicular objects 130 to allow direct comparisons to be made. In some embodiments an encoded object 132 may be shown for a vehicular object 130 at the request of the user, e.g. by selecting the vehicular object 130 of interest; for example, as described further below. In some embodiments the encoded object 132 may give a visual indication of more than operational descriptor of the descriptor data 54 at the same time. Accordingly, the embodiments described herein can be utilized to show a state of the industrial vehicles 30 that is unavailable by directly viewing the industrial vehicles 30 or by viewing the industrial vehicles 30 in real-time.

Conditional Encoded Object

Referring collectively to FIGS. 1-3 and 6, in some embodiments, the client functions 112 can automatically show a conditional encoded object 140 via the display 102 of the mobile client device 100. The conditional encoded object 140 can be encoded based at least in part upon one or more operational descriptor of the descriptor data 54 analogous to the encoding of the encoded object 132. The conditional encoded object 140 can be automatically shown on the display 102 according to input received by the mobile client device 100 such as, for example, tactile input, audible input, or the like. Alternatively or additionally, the conditional encoded object 140 can be shown periodically or upon the receipt of a push notification by the mobile client device 100. In some embodiments, the conditional encoded object 140 can automatically be deactivated from presentation upon the display 102. Accordingly, conditional encoded object 140 can be selectively added or removed from the display 102.

Like the encoded object 132, the conditional encoded object 140 can visually express information indicative of the operational characteristics of the industrial vehicle 30 via the display 102 of the mobile client device 100. In some embodiments, the conditional encoded object 140 can comprise a lift height object 142 that is encoded based upon an operational descriptor indicative of the position of the forks 36 of the industrial vehicle 30 with respect to the mast 34, which can be copied directly from or derived from one or more operational characteristic of the vehicular data 52.

Congestion

Figure 7:
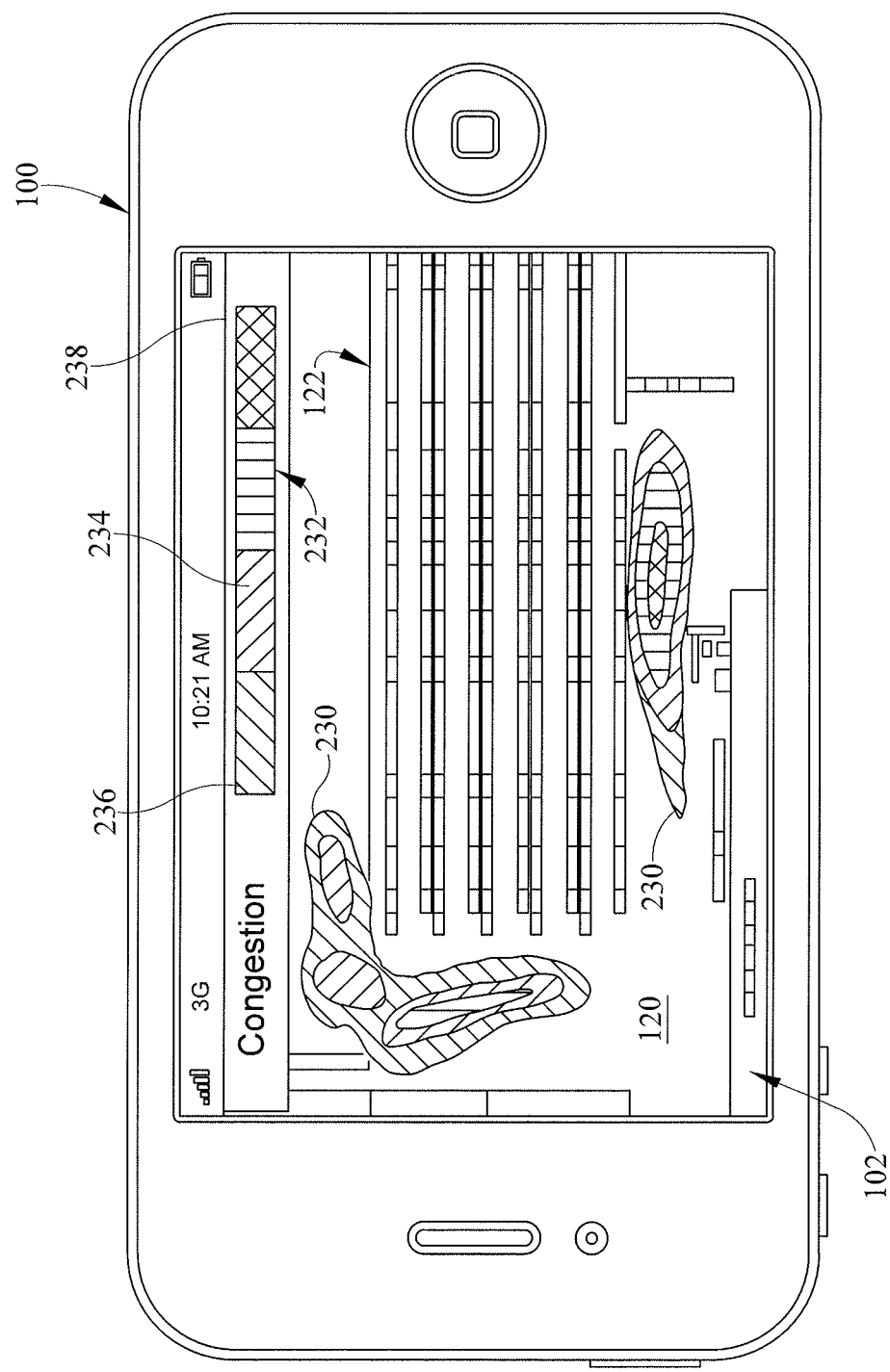

Referring collectively to FIGS. 1, 3 and 7, encoded objects 230 can be associated directly with the topographical warehouse object 120. As is noted above, the encoded objects 230 can be encoded based upon an operational descriptor, which can be copied directly from or derived from one or more operational characteristic of the vehicular data 52. Accordingly, the encoded object 230 can comprises a visual characteristic indicative of the operational descriptor.

In some embodiments, the encoded objects 230 can be derived from aggregated data, i.e., data from a plurality of industrial vehicles 30. In some embodiments, operational characteristics can be aggregated by the server functions 26 from a plurality of industrial vehicles 30 into the aggregated data. The server functions 26 can derive an operational descriptor from the aggregated data. In embodiments, where the localized positions and operational characteristics form a portion of the aggregated data, the operational descriptor, and thus the encoded object 230, can be indicative of a region of the inventory transit surface 62. For example, the localized positions can be utilized to associate the operational characteristics with the region of the inventory transit surface 62 that coincides with the localized positions. Accordingly, the client functions 112 can place the encoded object 230 such that the encoded object 230 occupies an area of the topographical warehouse object 120 that corresponds to the region of the inventory transit surface 62 and is indicative of the operational descriptor.

For example, the client functions 112 can automatically show a congestion scale 232, contemporaneously with the encoded objects 230, via the display 102 of the mobile client device 100. The congestion scale 232 can comprise a color gradient 234 having a first end 236 and a second end 238. The color gradient 234 of the congestion scale 232 can vary from the first end 236 to the second end 238 such that the color gradient 234 corresponds to varying levels of the congestion, i.e., slow moving traffic. In one embodiment, the first end 236 can correspond to a relatively low amount of traffic and the second end 238 can correspond to a relatively high amount of traffic. Accordingly, the colors of the color gradient 234 can correspond to amounts of traffic between the relatively low amount of traffic of the first end 236 and the relatively high amount of traffic of the second end 238.

Accordingly, each encoded object 230 can be colored according to one of the colors of the color gradient 234 to quantify the amount of traffic of the inventory transit surface 62 associated with the topographical warehouse object 120. Specifically, each encoded object 230 can occupy an area of the topographical warehouse object 120 that corresponds to a region of the inventory transit surface 62. The area of the encoded object 230 can be colored to match the color of the color gradient 234 that corresponds to the amount of traffic that is determined to be present in the region of the inventory transit surface 62. In some embodiments, the amount of traffic can be determined by the server functions 26 and provided as descriptor data 54. Specifically, the server functions 26 can extract localized positions, velocities, headings, or the like, from the vehicular data 52 and quantify the traffic corresponding to the regions of the inventory transit surface 62. In further embodiments, the encoded objects 230 can be encoded directly (e.g., alphanumeric code, chart, or the like) to indicate traffic information without the congestion scale 232.

Search/Filter

Figure 8:
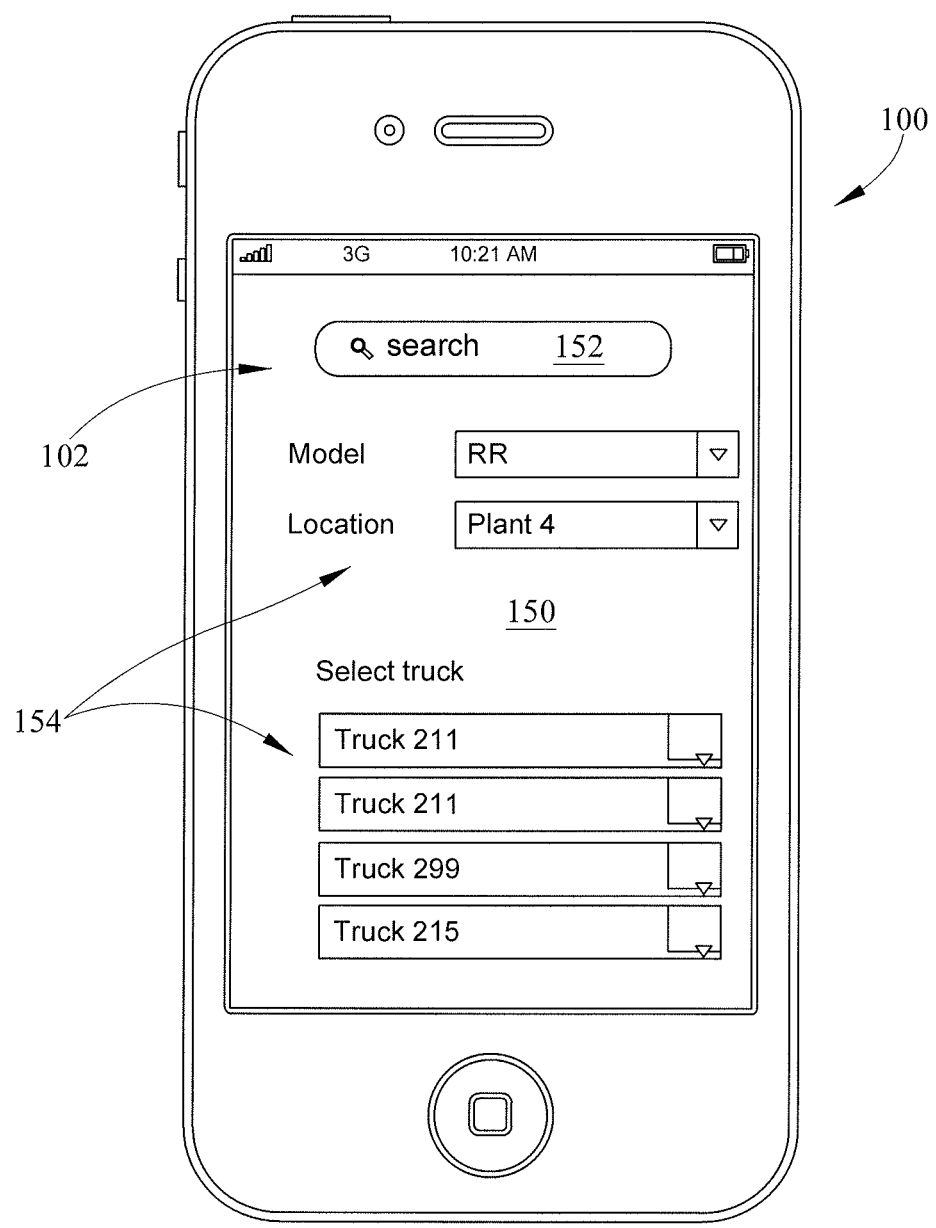

Referring collectively to FIGS. 1, 3 and 8, the embodiments described herein can be configured to receive selection input indicative of data reduction parameter. The data reduction parameter can be configured to search or filter the descriptor data 54. Accordingly, the data reduction parameter can be any instance of the descriptor data 54. In some embodiments, the client functions 112 can automatically show a parameter input interface 150 on the display 102 of the mobile client device 100. In embodiments where the display 102 is configured as a touch screen, the parameter input interface 150 can show controls and the display 102 can receive input from the control. For example, the parameter input interface 150 can comprise a search control 152 that receives input indicative of a data reduction parameter such as, for example, a selected operator or a selected industrial vehicle. The client functions 112, upon receipt of the data reduction parameter, can search the descriptor data 54 and determine a selected instance of the descriptor data 54. When the selected instance is found, the client functions 112 can automatically show a summary of the selected instance upon the display 102. In some embodiments, the client functions 112 can automatically show encoded objects 132, 230 related to the selected instance of the descriptor data 54.

In some embodiments, the parameter input interface 150 can comprise a filter control 154 that classifies descriptor data 54 into fields of data reduction parameters. The filter control 154 can be configured to show the fields of data reduction parameters upon the display 102. The client functions 112, upon the selection of one or more of the data reduction parameters, can determine a selected instance of the descriptor data 54. In some embodiments, the client functions 112 can automatically show encoded objects 132, 230 related to the selected instance of the descriptor data 54. For example, the data reduction parameters can include descriptor data 54 indicative of industrial vehicle parameters such as, for example, vehicle type, vehicle serial number, vehicle classification, or the like. After selection of the one or more industrial vehicle parameter, one or more selected industrial vehicles of the industrial vehicles 30 can be determined based upon the selection of the one or more industrial vehicle parameter. Accordingly, the client functions 112 can automatically show encoded objects 132, 230 related to the one or more selected industrial vehicles of the industrial vehicles 30.

In a further example, the data reduction parameters can include one or more operator descriptor of the descriptor data 54 indicative of the operator association of one or more of the industrial vehicles 30. After selection of the operator descriptor, one or more selected industrial vehicles of the industrial vehicles 30 can be determined based upon the operator associations of the one or more operator descriptors. Accordingly, the client functions 112 can automatically show encoded objects 132, 230 related to the one or more selected industrial vehicles of the industrial vehicles 30.

Mobile Client Device Alarms

Figure 9:
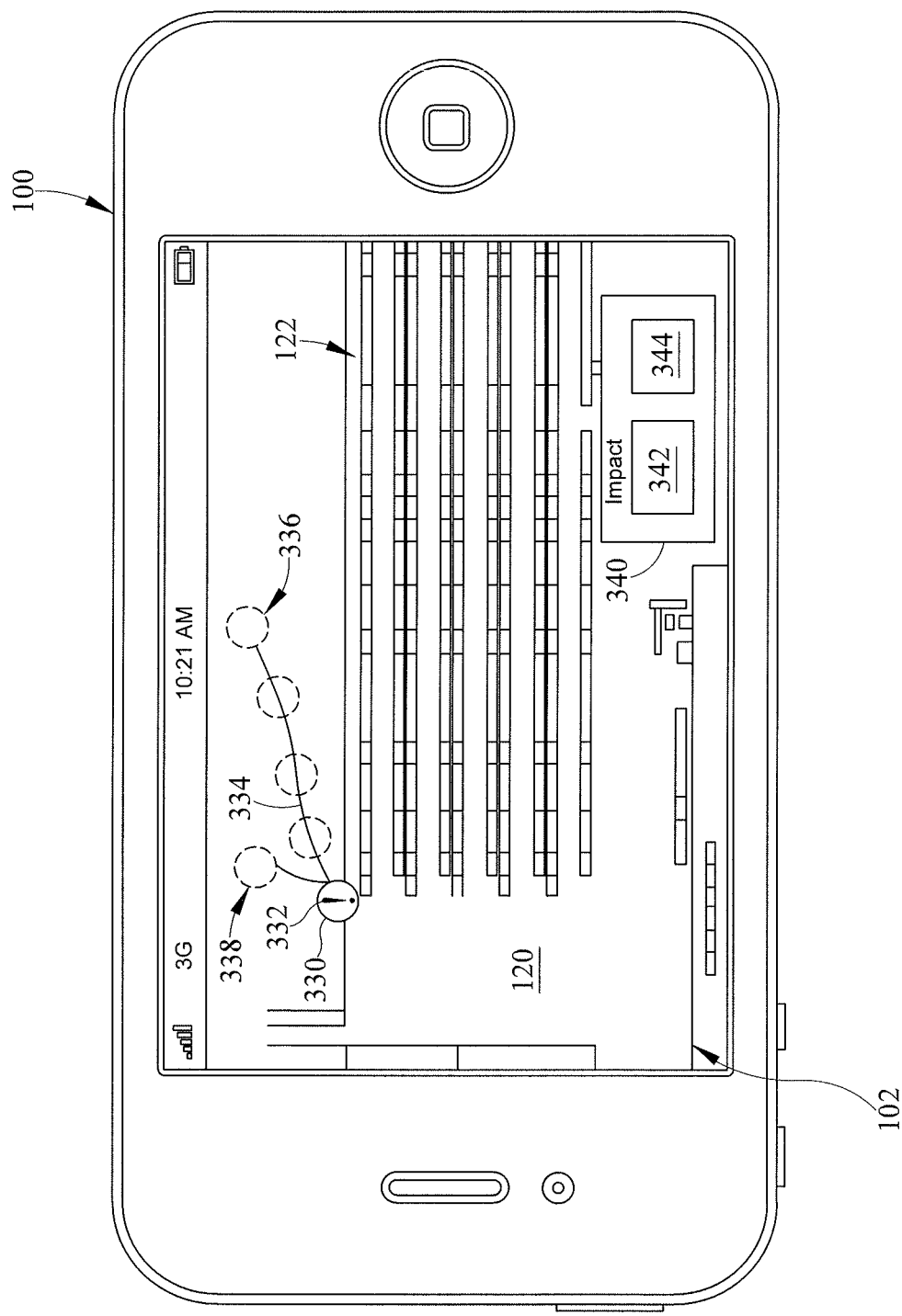

Referring collectively to FIGS. 1, 3 and 9, the mobile client device 100 can receive descriptor data 54 comprising an alarm descriptor indicative of a detected alarm. As is noted above, vehicle functions 28 or server functions 26 can automatically generate alarm descriptors. In some embodiments, the management server 20 can automatically push descriptor data 54 to the mobile client device 100 upon the detection of the alarm. Alternatively or additionally, the mobile client device 100 can pull descriptor data 54 from the management server 20 to periodically search for alarms or to search for alarms in response to user input. Accordingly, upon notification of the alarm, the client functions 112 can automatically show a conditional encoded object 340.

As is noted above, the alarm descriptor can be indicative of an impact. In some embodiments, upon receipt of the alarm descriptor indicative of the impact, the client functions 112 can automatically show a vehicular object 330 upon the topographical warehouse object 120 via the display 102. The vehicular object 330 can be located with respect to the topographical warehouse object 120 to indicate the localized position of the industrial vehicle 30 when the impact was detected. In some embodiments, the encoded object 332 can be configured to provide visual characteristics indicative of an impact.

Impact Playback

In further embodiments, the mobile client device 100 can provide playback of the impact. For example, in addition to determining that an impact has occurred, the management server 20 can determine an impact time indicative of a point in time corresponding to the occurrence of the impact of the industrial vehicle 30. Alternatively or additionally, the management server 20 can determine an impact position indicative of the localized position of the industrial vehicle 30 at an occurrence of the impact. Based upon the impact time, impact position or both, the management server 20 can evaluate a pre-impact time period and a post impact time period to determine operational characteristics indicative of the impact such as, for example, travel path, localization data, velocity, braking, forces, acceleration, time data, or the like. Accordingly, the descriptor data 54 can further comprise impact descriptors indicative of operational characteristics indicative of the impact.

In some embodiments, the client functions 112 of the mobile client device 100 can automatically transform the descriptor data 54 into an impact path object 334. The impact path object 334 can be indicative of the movement of the industrial vehicle 30 from a pre-impact position 336 to the position of the industrial vehicle at the impact time, which can correspond to the location of the vehicular object 330 with respect to the topographical warehouse object 120. Alternatively or additionally, the impact path object 334 can be indicative of the movement of the industrial vehicle 30 from the position of the industrial vehicle at the impact time to a post-impact position 338. Accordingly, in some embodiments, the impact path object 334 can depict the travel of the vehicular object 330 from the pre-impact position 336 through the post-impact position 338. It is noted that the impact path object 334 can be shown statically (e.g., a curve corresponding to movement of the industrial vehicle 30), dynamically (e.g., animation showing movement of the vehicular object 330, which is generally indicated by dashed circles), or both. Furthermore, as is noted above, the client functions 112 can automatically show the conditional encoded object 340 to provide information indicative of the alarm descriptor or controls for the manipulation of the playback of the animation showing movement of the vehicular object 330, i.e., play, stop, pause, or the like. Applicants have discovered that showing the impact path object 334 can substantially increase the quality of an operator's response to the impact. For example, at the time of the impact it can be difficult to diagnose the severity of the impact or to identify the cause of the impact. That is, physical evidence of the impact can be difficult to correlate to the severity of the impact (i.e., determination if the industrial vehicle 30 can be returned to service) or to identify the cause of the impact. The impact path object 334 provides information related to the states leading up to the impact, following the impact, or both leading up to and following the impact. Accordingly, the impact path object can be used to evaluate and simulate the impact, repeatedly if necessary, to facilitate the diagnosis of the severity of the impact and the cause of the impact. Thus, corrective action can be taken to repair the industrial vehicle 30, reactivate the industrial vehicle 30, train operators of the industrial vehicle 30, reconfigure the facility to mitigate future similar impacts, or the like.

Additionally, the conditional encoded object 340 can comprise an annotation control 342 that can be utilized to receive input from a user of the mobile client device 100. The input (e.g., audible or tactile) received by the annotation control 342 can be transmitted as a portion of the client data 114 to the management server 20. Accordingly, the server functions 26 can automatically associate the client data 114 with the alarm descriptor. In some embodiments, the user of the mobile client device 100 can use the annotation control 342 to provide queries to the management server 20, the industrial vehicle 30 or both. In some embodiments, the vehicular data 52 or the descriptor data 54 can be queried for additional information. Alternatively or additionally, the user of the mobile client device 100 can communicate via the management server 20 and the industrial vehicle to the operator of the industrial vehicle 30. Accordingly, the cause of the accident can be investigated via communication between the user and the operator.

Additionally, the conditional encoded object 340 can comprise an acknowledgement control 344 that can be utilized to receive input from a user of the mobile client device 100 indicative of a desire to acknowledge the impact. As is noted above, post impact actions can automatically occur to ameliorate the impact such as, for example, disabling the industrial vehicle involved in the impact. In some embodiments, the input (e.g., audible or tactile) received by the acknowledgement control 344 can be transmitted as a portion of the client data 114 to the management server 20. Accordingly, the server functions 26 can automatically cancel some or all of the post impact actions based upon the client data 114.

It is noted that the term "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is furthermore noted that the claims included herewith may make use of the term "one or more" in addition to the use of an indefinite articles "a" or "an" and definite article "the." Usage of the term "one or more" should not be interpreted as altering the meaning of such articles or as changing transitional phrases preceding such articles from open-ended claim language to closed claim language. For example, should a claim include the term "one or more" and a limitation that recites "comprises an object," the limitation should not be interpreted as "comprises a single object," or "consists of an object." Instead, such usage should be interpreted as inclusive or open-ended and not exclusive of additional, unrecited elements or method steps.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising a management server, a plurality of industrial vehicles, and a mobile client device separate from the plurality of industrial vehicles, wherein:

the management server comprises one or more server processors;

each of the industrial vehicles comprises one or more vehicular processors, and is communicatively coupled to the management server;

the mobile client device comprises a display, a wireless communication circuit, and one or more client processors, and is communicatively coupled to the management server;

the one or more vehicular processors of each of the industrial vehicles execute vehicle functions to:
  (i) determine a localized position with respect to an inventory transit surface of an industrial facility;
  (ii) detect an operational characteristic;
  (iii) transmit vehicular data indicative of the localized position and the operational characteristic to the management server; and
  (iv) navigate along the inventory transit surface of the industrial facility to change respective positions of the industrial vehicles;

the one or more server processors of the management server execute server functions to:
  (i) determine based upon the vehicular data that an impact has occurred involving one of the industrial vehicles; and
  (ii) derive an impact descriptor indicative of the impact from the vehicular data;

the wireless communication circuit of the mobile client device receives the impact descriptor; and the one or more client processors of the mobile client device execute client functions to:
  (i) display a topographical warehouse object via the display of the mobile client device, wherein the topographical warehouse object comprises a geometric representation indicative of the inventory transit surface of the industrial facility;
  (ii) display a vehicular object contemporaneously with the topographical warehouse object via the display of the mobile client device, wherein the vehicular object is positioned with respect to the topographical warehouse object to indicate an impact position of the one of the industrial vehicles corresponding to the localized position of the one of the industrial vehicles at an occurrence of the impact; and
  (iii) display an impact path object contemporaneously with and superimposed on the topographical warehouse object via the display of the mobile client device, wherein the impact path object is indicative of movement of the one of the industrial vehicles from a pre-impact position to the impact position, from the impact position to a post-impact position, or from the pre-impact position to the post-impact position.

2. The system of claim 1, wherein the impact path object is presented statically.

3. The system of claim 1, wherein the impact path object is presented as an animation.

4. The system of claim 3, wherein the one or more client processors execute the client functions to provide controls for manipulation of the animation.

5. The system of claim 1, wherein the one or more vehicular processors of the one of the industrial vehicles execute vehicle functions to disable the one of the industrial vehicles involved in the impact after the impact has occurred.

6. The system of claim 5, wherein:
the one or more client processors of the mobile client device execute client functions to:
  (i) present an acknowledgement control via the display of the mobile client device; and
  (ii) receive input indicative of a desire to acknowledge the impact with the acknowledgement control; and
the one or more server processors of the management server execute server functions to reactivate the one of the industrial vehicles involved in the impact after the input is received with the acknowledgement control.

7. The system of claim 1, wherein the display of the topographical warehouse object, the vehicular object, and the impact path object is near enough to real-time to permit corrective action to be taken quickly enough to mitigate the negative impact of latency caused by a communication of changing positions of the plurality of industrial vehicles to the mobile client device.

8. The system of claim 1, wherein the one or more client processors of the mobile client device further execute client functions:
transform the impact descriptor into the impact path object, wherein the impact path object is indicative of movement of the one of the industrial vehicles in a manner that is representative of the motion of the one of the industrial vehicles with respect to the topographical warehouse object.

9. A mobile client device separate from an industrial vehicle and comprising a display, a wireless communication circuit, and one or more client processors, wherein:
the mobile client device is communicatively coupled to a management server;
the management server comprises one or more server processors;
the management server is communicatively coupled to a plurality of industrial vehicles;
each of the industrial vehicles comprises one or more vehicular processors;
the one or more vehicular processors of each of the industrial vehicles execute vehicle functions to:
  (i) determine a localized position with respect to an inventory transit surface of an industrial facility;
  (ii) detect an operational characteristic;
  (iii) transmit vehicular data indicative of the localized position and the operational characteristic to the management server; and
  (iv) navigate along the inventory transit surface of the industrial facility to change respective positions of the industrial vehicles;
the one or more server processors of the management server execute server functions to:
  (i) determine based upon the vehicular data that an impact has occurred involving one of the industrial vehicles; and
  (ii) derive an impact descriptor indicative of the impact from the vehicular data;
the wireless communication circuit of the mobile client device receives the impact descriptor; and
the one or more client processors of the mobile client device execute client functions to:
  (i) display a topographical warehouse object via the display of the mobile client device, wherein the topographical warehouse object comprises a geometric representation indicative of the inventory transit surface of the industrial facility;
  (ii) display a vehicular object contemporaneously with the topographical warehouse object via the display of the mobile client device, wherein the vehicular object is positioned with respect to the topographical warehouse object to indicate an impact position of the one of the industrial vehicles corresponding to the localized position of the one of the industrial vehicles at an occurrence of the impact; and (iii) display an impact path object contemporaneously with and superimposed on the topographical warehouse object via the display of the mobile client device, wherein the impact path object is indicative of movement of the one of the industrial vehicles from a pre-impact position to the impact position, from the impact position to a post-impact position, or from the pre-impact position to the post-impact position.

10. The mobile client device of claim 9, wherein the impact path object is presented statically.

11. The mobile client device of claim 9, wherein the impact path object is presented as an animation.

12. The mobile client device of claim 11, wherein the one or more client processors execute the client functions to provide controls for manipulation of the animation.

13. The system of claim 9, wherein the one or more vehicular processors of the one of the industrial vehicles execute vehicle functions to disable the one of the industrial vehicles involved in the impact after the impact has occurred.

14. The method of claim 13, wherein:
the one or more client processors of the mobile client device execute client functions to:
(i) present an acknowledgement control via the display of the mobile client device; and
(ii) receive input indicative of a desire to acknowledge the impact with the acknowledgement control; and
the one or more server processors of the management server execute server functions to reactivate the one of the industrial vehicles involved in the impact after the input is received with the acknowledgement control.

15. The mobile client device of claim 9, wherein the display of the topographical warehouse object, the vehicular object, and the impact path object is near enough to real-time to permit corrective action to be taken quickly enough to mitigate the negative impact of latency caused by a communication of changing positions of the plurality of industrial vehicles to the mobile client device.

16. The mobile client device of claim 9, wherein the one or more client processors of the mobile client device further execute client functions:
transform the impact descriptor into the impact path object, wherein the impact path object is indicative of movement of the one of the industrial vehicles in a manner that is representative of the motion of the one of the industrial vehicles with respect to the topographical warehouse object.

17. A method comprising:
disposing each of a plurality of industrial vehicles upon an inventory transit surface of an industrial facility, wherein each of the plurality of industrial vehicles are in communication with a management server and the management server is in communication with a mobile client device separate from the plurality of industrial vehicles, and wherein the mobile client device comprises a display, a wireless communication circuit, and one or more client processors;
determining a localized position of each of the industrial vehicles with respect to the industrial facility;
detecting an operational characteristic of each of the industrial vehicles;
determining based upon the localized position and the operational characteristic of each of the industrial vehicles that an impact has occurred involving one of the industrial vehicles;
navigating each of the industrial vehicles upon the inventory transit surface of the industrial facility to change respective positions of the industrial vehicles;
receiving, automatically with the wireless communication circuit of the mobile client device, an impact descriptor indicative of the impact of the one of the industrial vehicles;
displaying a topographical warehouse object via the display of the mobile client device, wherein the topographical warehouse object comprises a geometric representation indicative of the inventory transit surface of the industrial facility;
displaying a vehicular object contemporaneously with the topographical warehouse object via the display of the mobile client device, wherein the vehicular object is positioned with respect to the topographical warehouse object to indicate an impact position of the one of the industrial vehicles corresponding to the localized position of the one of the industrial vehicles at an occurrence of the impact; and
displaying an impact path object contemporaneously with and superimposed on the topographical warehouse object via the display of the mobile client device, wherein the impact path object is indicative of movement of the one of the industrial vehicles from a pre-impact position to the impact position, from the impact position to a post-impact position, or from the pre-impact position to the post-impact position.

18. The method of claim 17, further comprising:
transforming the impact descriptor into the impact path object, wherein the impact path object is indicative of movement of the one of the industrial vehicles in a manner that is representative of the motion of the one of the industrial vehicles with respect to the topographical warehouse object.

19. The method of claim 17, further comprising:
disabling the one of the industrial vehicles involved in the impact after determining the impact has occurred.

20. The method of claim 19, further comprising:
presenting, automatically with the one or more client processors of the mobile client device, an acknowledgement control via the display of the mobile client device;
receiving input indicative of a desire to acknowledge the impact with the acknowledgement control; and
reactivating the one of the industrial vehicles involved in the impact after the input is received with the acknowledgement control.

21. The method of claim 17, wherein the impact path object is presented ene-of-statically or as an animation.

22. The method of claim 17, further comprising:
presenting, automatically with the one or more client processors of the mobile client device, controls for manipulation of the animation via the display of the mobile client device.

23. The method of claim 17, wherein the displaying of the topographical warehouse object, the vehicular object, and the impact path object is near enough to real-time to permit corrective action to be taken quickly enough to mitigate the negative impact of latency caused by a communication of changing positions of the plurality of industrial vehicles to the mobile client device.

* * * * *

UNITED STATES PATENT AND TRADEMARK OFFICE
CERTIFICATE OF CORRECTION

PATENT NO. : 9,523,582 B2
APPLICATION NO. : 14/488660
DATED : December 20, 2016
INVENTOR(S) : Kashyap Chandrasekar et al.

It is certified that error appears in the above-identified patent and that said Letters Patent is hereby corrected as shown below:

In the Specification

Column 1, Line 10:
"This application is related to Application No. ###, filed Month Day, Year, entitled "SYSTEMS AND METHODS FOR SUPERVISING INDUSTRIAL VEHICLES," and Application No. ###, filed Month Day, Year, entitled "SYSTEMS, METHODS, AND MOBILE CLIENT DEVICES FOR SUPERVISING INDUSTRIAL VEHICLES.""
Should read:
--This application is related to Application No. 14/488,654 filed September 17, 2014, entitled "SYSTEMS AND METHODS FOR SUPERVISING INDUSTRIAL VEHICLES VIA ENCODED VEHICULAR OBJECTS SHOWN ON A MOBILE CLIENT DEVICE," Attorney Docket No. CRNZ 0048 PA1/40165.972, and Application No. 14/488,659, filed September 17, 2014, entitled "SYSTEMS, METHODS, AND MOBILE CLIENT DEVICES FOR SUPERVISING INDUSTRIAL VEHICLES," Attorney Docket No. CRNZ 0048 PA2/40165.1048.--;

Column 4, Line 6:
"FIG. 1 schematically depicts a systems for showing"
Should read:
--FIG. 1 schematically depicts a system for showing--;

Column 4, Line 31:
"Each state can indicative of an instance of operation of the"
Should read:
--Each state can be indicative of an instance of operation of the--;

Column 7, Line 59:
"munication circuit can comprise cellular modem module and"
Should read:
--munication circuit can comprise a cellular modem module and--;

Signed and Sealed this
Twenty-ninth Day of May, 2018

Andrei Iancu
*Director of the United States Patent and Trademark Office*

CERTIFICATE OF CORRECTION (continued)

Column 10, Line 40:
"tic, can be transmitted by the communication circuit 50 of"
Should read:
--tics, can be transmitted by the communication circuit 50 of--;

Column 14, Line 19:
"ably two or more) location descriptor. In some embodi-"
Should read:
--ably two or more) location descriptors. In some embodi- --;

Column 14, Line 25:
"updated to represent additional states of the industrial"
Should read:
--be updated to represent additional states of the industrial--;

Column 15, Line 6:
"derived from one or more operational characteristic of the"
Should read:
--derived from one or more operational characteristics of the--;

Column 15, Line 44:
"upon one or more operational descriptor of the descriptor"
Should read:
--upon one or more operational descriptors of the descriptor--;

Column 15, Line 46:
"comprise one or more system that has a finite life span (e.g.,"
Should read:
--comprise one or more systems that has a finite life span (e.g.--;

Column 16, Line 31:
"more operational descriptor of the descriptor data 54 analo-"
Should read:
--more operational descriptors of the descriptor data 54 analo- --;

Column 16, Line 53:
"more operational characteristic of the vehicular data 52"
Should read:
--more operational characteristics of the vehicular data 52--;

Column 16, Lines 62-63:
"from one or more operational characteristic of the vehicular data 52. Accordingly, the encoded object 230 can comprises"
Should read:
--from one or more operational characteristics of the vehicular data 52. Accordingly, the encoded object 230 can comprise--;

CERTIFICATE OF CORRECTION (continued)
U.S. Pat. No. 9,523,582 B2

Column 18, Line 27:
"or more industrial vehicle parameter, one or more selected"
Should read:
--or more industrial vehicle parameters, one or more selected--;

Column 18, Line 30:
"industrial vehicle parameter. Accordingly, the client func-"
Should read:
--industrial vehicle parameters. Accordingly, the client func- --;

Column 18, Line 35:
"include one or more operator descriptor of the descriptor"
Should read:
--include one or more operator descriptors of the descriptor--; and In the Claims Column 24, Claim 21, Line 54:
"object is presented ene-of-statically or as an animation."
Should read:
--object is presented statically or as an animation.--.